B. JACKSON.
Horse Hay-Fork.
No. 210,458.  Patented Dec. 3, 1878.
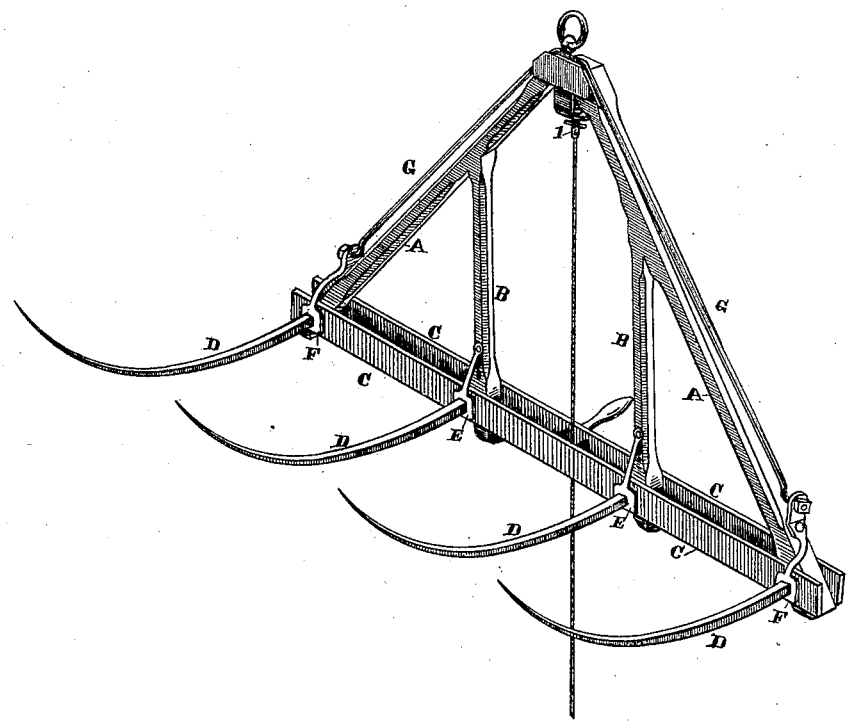
Witnesses
Geo. H. Strong
Frank A. Brooks
Inventor
Byron Jackson
By Dewey & Co.
Attys

UNITED STATES PATENT OFFICE.

BYRON JACKSON, OF WOODLAND, CALIFORNIA.

IMPROVEMENT IN HORSE HAY-FORKS.

Specification forming part of Letters Patent No. 210,458, dated December 3, 1878; application filed October 1, 1878.

*To all whom it may concern:*

Be it known that I, BYRON JACKSON, of Woodland, county of Yolo, and State of California, have invented a Light-Weight Horse-Fork; and I do hereby declare the following to be a full, clear, and exact description thereof, reference being had to the accompanying drawing.

My invention relates to certain improvements in devices known as "horse-forks," such as are employed to handle headed grain and hay or straw; and it consists of a novel construction of the head in two pieces and a light frame-work having as many bars as there are tines in the fork, the two outside bars being united at one end and diverging from each other at the opposite end to receive the outside tines, and the other bars of the frame receiving the inner tines at one end and united at the other end to the outside bars. One end of each of the bars of this frame is locked between the two head-pieces by the tines passing through them, the tines being shouldered in a light iron brace on one side and a nut screwed down on the other. The braces are each bolted to a bar of the frame, thus bringing the strain of each tine lengthwise with each bar of the frame, having no twisting-strain on any portion of the frame or head, as is the case in the old method of using a single head-piece, and clamping the lifting-arms to it by means of cast or wrought iron bands.

By this construction I reduce the weight nearly one-half and retain the same strength, referring to the accompanying drawing for a more complete explanation of my invention.

The figure is a perspective view of my fork.

A A are two outer bars of the frame, united at one end by two pieces of plate-iron riveted on each side, forming a place for the latch I. The opposite ends of these bars diverge from each other to receive the outer tines, D D. The inner bars of the frame, B B, are united to the outer bars, A A, and extend down to receive the inner tines. The two head-pieces C C are placed, one each side of the pieces A A and B B, and the tines D D D D are passed through them, thus firmly locking the whole together by a nut on the tine, and the tine shouldered in the braces E E and F F.

The braces E E support the inner tines, and are bolted to the under side of B B. The braces F F support the outer tines, and extend forward and upward, and are bolted to the outside of A A, the ends being extended beyond the bolts, and having eyes formed in them, and turned outward to receive the bail G. By extending this brace F the proper distance from the head the fork can be balanced as desired, so that when the load is dumped and the fork dropped on the pile it will not stick the tines in the straw, but rest on the back and slide back on the tines without an effort from the forkman.

The bail is formed of a single piece of round iron, turned back on itself, forming a loop in the center, then welded, and the loop turned across the axis of the bail. It is then bent over a form to fit the fork-arms A A, and the ends turned outward in a line parallel with two head-pieces, C C, form the journals, which are thus in the axis of motion.

The latch is thrown forward by a spiral spring, and holds the bail while lifting the load.

By this construction the frame-work A and B, together with the braces E and F, receive the direct strain of the tines D straight with the grain of the wood, having no twisting-strain. The pieces C C serve only to stiffen the frame and space the tines, receiving no lifting-strain whatever.

By turning the axis of the bail straight, instead of forming a loop, I avoid catching and breaking it, and it being protected by the frame A, I am enabled to use lighter iron, thus making the lightest horse-fork in use.

Having thus described my invention, what I claim as new, and desire to secure by Letters Patent, is—

1. The head formed of the parallel strips C, inclosing the timbers A B between them, and provided with the tines D, which pass through the timbers and side strips and are secured by nuts, substantially as and for the purpose herein described.

2. The improvement in horse-forks consisting of the head formed of the parallel strips C, and inclosing the timbers A B, in combination with the tines D, passing through and uniting these timbers, and the braces E F, substantially as and for the purpose herein described.

3. The bail G, having the eye or loop formed in the center, said bail being shaped to fit the timbers A, and hinged or journaled at its lower end in the eyes in the braces F, substantially as and for the purpose herein described.

In witness whereof I hereunto set my hand.

BYRON JACKSON.

Witnesses:
G. W. BONDS,
A. JACKSON.